United States Patent [19]

Kukla

[11] 4,377,841
[45] Mar. 22, 1983

[54] HIGH INTENSITY DISCHARGE LIGHTING SYSTEM

[75] Inventor: Laurence J. Kukla, Waukegan, Ill.

[73] Assignee: International Harvester Co., Chicago, Ill.

[21] Appl. No.: 102,492

[22] Filed: Dec. 11, 1979

[51] Int. Cl.³ .............................................. B60Q 1/02
[52] U.S. Cl. .................................... 362/80; 362/362; 362/802; 180/53 R
[58] Field of Search ......................... 315/78; 313/229; 180/53 R, 53 A; 362/61, 62, 80, 362, 802

[56] References Cited

U.S. PATENT DOCUMENTS

| | | | |
|---|---|---|---|
| 3,102,993 | 9/1963 | Jensen | 362/62 X |
| 3,191,019 | 6/1975 | Rijnders et al. | 362/263 X |
| 3,283,485 | 11/1966 | Koch | 180/53 R |
| 3,440,740 | 4/1969 | Kamluckin | 180/53 R |
| 3,442,069 | 5/1969 | Butler | 180/53 R |
| 3,789,943 | 2/1974 | Kampert et al. | 180/54 R |
| 3,883,794 | 5/1975 | Sivley | 180/53 R |
| 4,023,030 | 5/1977 | Teti | 362/61 |
| 4,084,215 | 4/1978 | Willenbrock | 362/62 X |
| 4,299,575 | 11/1981 | Carrow | 362/61 X |

*Primary Examiner*—Peter A. Nelson
*Attorney, Agent, or Firm*—D. K. Sullivan; F. D. Au Buchon

[57] ABSTRACT

A mobile land vehicle having an engine arranged to provide motive power to the vehicle and to pump or pumps in a hydraulic work circuit; the engine governed to operate at a given speed. An alternator is also driven by the engine and connected to provide alternating current to high intensity discharge lamps which are capable of operation only between a relatively narrow range of current frequencies. The drive means to the alternator produces a frequency near the high end of said range when said engine is at or near its governed speed and the frequency approaches the lower end of said range as the engine speed is lugged down under full load.

4 Claims, 5 Drawing Figures

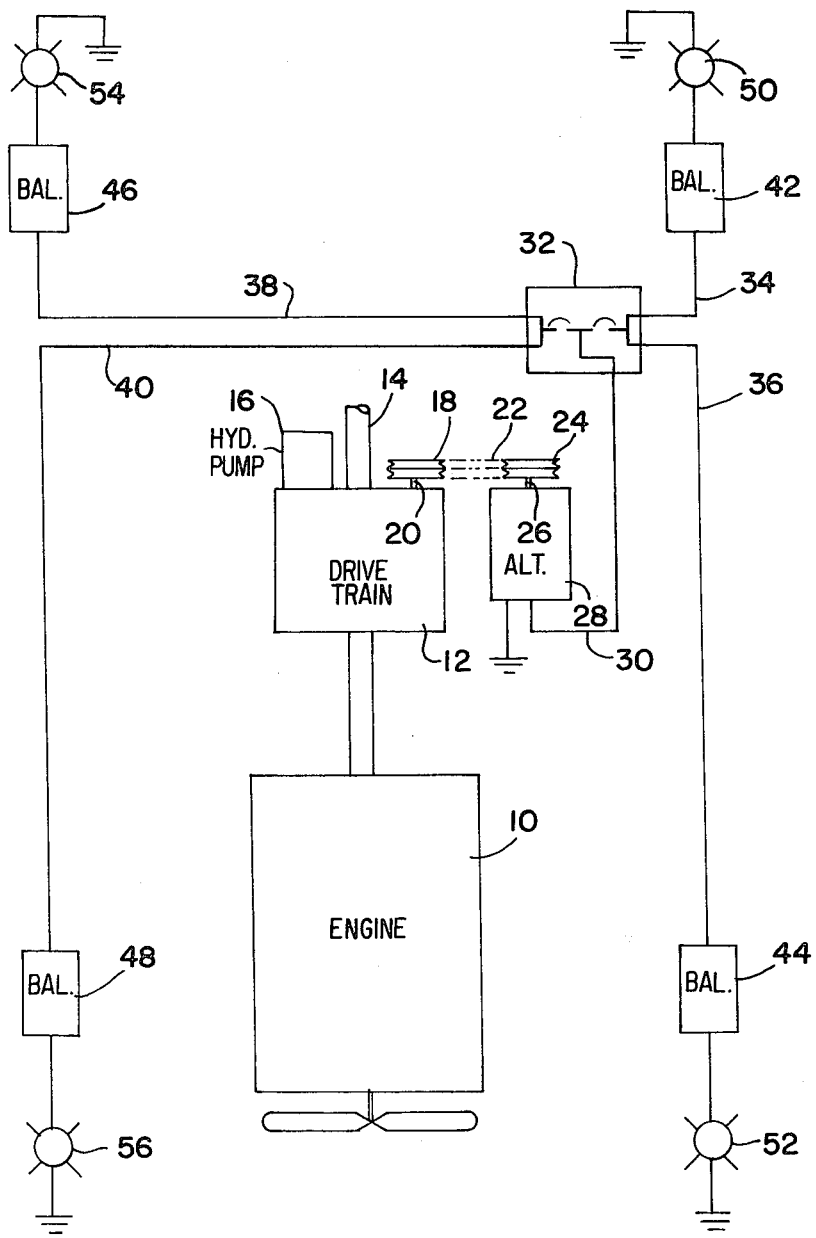

HIGH INTENSITY DISCHARGE LIGHTING SYSTEM

Certain types of equipment, such as that generally, called construction equipment, for example, must be operated for periods of time which exceed the normal work day in order to meet contract deadlines, or other scheduling goals, and/or to obtain a reasonable return on the investment in the equipment due to its high initial cost. Obviously, such long periods of operation will extend into non-daylight hours, which inherently necessitate some form of artificial lighting. Construction equipment, by its very nature, operates outdoors in an open and often transitory and remote environment. Consequently, it is frequently impractical to provide a fixed lighting system and independent, mobile systems which are capable of operation in a remote area lack the ability to automatically direct the light output to the locations where that light is most needed.

Lighting systems mounted on and carried by the equipment itself are preferable because the light source inherently moves with the equipment and tends to be uniformly directed at the area where such light can be most useful. Conventional lighting systems, such as the twelve volt, incandescent lamp, direct current systems commonly used in the automotive field, are not adequate for construction equipment use because the light tends to be too narrowly confined and/or the total light output is not high enough. High intensity discharge (HID) lamps and systems incorporating the same are known to deliver a widely directed light at a relatively high total output level. The problem with HID systems is that the HID lamp is frequency sensitive and will not remain lighted if the frequency is not maintained within relatively narrow limits. Because of its frequency-sensitive nature, lighting systems using HID lamps have been restricted in the prior art to uses in which the alternator providing the current to the HID lamps was powered by an engine which had very little or no load imposed on it other than the alternator load.

It is, therefore, an object of this invention to provide a lighting system for a mobile land vehicle which uses high intensity discharge lamps and in which the alternator supplying the current to those lamps is driven by the same power source that provides power to the vehicle's wheels for tractive effort and that provides power to work circuits for implements on and/or steering of the vehicle.

It is also an object of this invention to provide a vehicle with a drive and power control system which will permit the use of frequency sensitive, high intensity discharge lamps for lighting the work area of the vehicle.

It is a further object of this invention to provide drive means for a high intensity discharge lighting system in which the prime mover on the vehicle can be lugged down from its rated speed and still maintain the high intensity discharge lamps operational.

These and other objects of the present invention and many of the attendant advantages thereof will become more readily apparant from a perusual of the following description and the accompanying drawings, wherein:

The sole FIGURE is a schematic representation of a high intensity discharge lighting system according to the present invention.

DESCRIPTION OF A PREFERRED EMBODIMENT

Referring now to the drawing, an engine 10 is coupled to a drive train 12, which includes a clutch and a transmission with forward-reverse and speed change gears. The output from the transmission provides tractive effort to the wheels of the vehicle through output drive shaft 14. A hydraulic pump 16, which is part of a hydraulic circuit for providing power to implements on and steering of the vehicle, is driven by the engine 10 and maintains its speed and flow at pressure capability as a function of engine speed. The vehicle drive and power control means referred to herein is disclosed more fully in U.S. Pat. No. 3,789,943, issued Feb. 5, 1974 to Keith W. Kampert and Kenneth E. Houtz.

A drive pulley means 18 is also driven, for convenience, from the power train 12 by means of shaft 20 which rotates at the same speed as the engine 10. Drive belts 22 transfer the power from the pulley means 18 to a pulley means 24 affixed to the rotating armature 26 of an alternator 28, which may be of the permanent magnet, internally regulated type, capable of producing a 120 volt alternating current at 60 hertz when the armature 26 is rotating at 1800 rpm. The frequency of the alternating current produced by the alternator 28 is a direct function of the rotational speed of the armature of the alternator 28. This current is directed through conductor 30 to a junction box 32 which is provided with two circuit breakers of conventional construction. From the box 32, the conductor 30 connects with conductors 34, 36, 38 and 40, each of which is connected in series with ballasts 42, 44, 46 and 48 and high intensity discharge lamps 50, 52, 54 and 56 respectively. These lamps may be, for example, multi-vapor metal halide 400 watt, 120 volt, such as those sold by General Electric Company as part No. NV400/U. These lamps are designed to operate at 60 hertz and are sensitive to frequency fluctuations. Since these lamps can tolerate only a frequency fluctuation of plus or minus 10 hertz, they normally will not operate at frequencies above 70 hertz or below 50 hertz. The ballasts 42, 44, 46 and 48 are compatible with these lamps and may be, for example, the same as or similar to a ballast sold by Jefferson Electrical Products as part No. 4-301.

The engine 10 is governed, in a conventional manner, to operate below a given speed, which may be referred to as high idle speed. In fact, however, under no load condition the engine will overspeed and may momentarily, at least, run at a higher speed. For example, an engine governed to run at 1900 rpm rated speed may overspeed to as much as 2000 rpm high idle speed, when a load thereon is removed. Hence, the pulley ratio for driving the alternator must be selected so that the speed of the alternator, when the engine is rotating at high idle speed will produce alternating current at a frequency which is at or very near the upper tolerance level of the lamps. In the example given previously, the diameters of the armature pulley 26 to the drive pulley 24 to provide a pulley ratio of 1.1 to 1 will provide an alternator speed of 2090 rpm when the engine speed is 1900 rpm. Since the alternator frequency output is a direct function of alternator speed, the frequency of the alternating current at 2090 rpm will be 69.7 hertz. At this pulley ratio the engine speed could be reduced to 1364 rpm to produce an armature speed of 1500 rpm, which would yield a 50 hertz frequency current.

When the engine overspeeds above 1900 rpm, the frequency of the output current from the alternator will exceed 70 hertz. While normally the lamps would not operate at these frequencies, the arrangement disclosed herein has been operated successfully with engine overspeed in the 2000 rpm range. It is believed that such operation is successful because the overspeed above the governed 1900 rpm is of short duration, being insufficiently long to affect the operation of the lamps, although the momentary output frequency of the alternator exceeds the upper limit at which the lamps can normally be operated.

While one embodiment of the present invention has been disclosed and illustrated herein, it will be appreciated that other embodiments will be apparent to those of ordinary skill in the art without departing from the spirit of the invention as defined by the scope of the appended claims.

I claim:

1. In a self-propelled mobile land vehicle including a work implement carried on the vehicle, an engine having a substantial range of operating speeds, including high idle speed, rated speed and peak torque speed, in response to the load imposed thereon, a drive train for propelling the vehicle operatively associated with and driven by said engine, a hydraulic pump driven by said engine and operatively associated with said engine and operatively associated with said implement, an alternator driven by said engine for supplying alternating current at a frequency directly proportional to the speed of said engine, and a lighting system mounted on said vehicle and having lamps with ballasts electrically powered directly connected to by said alternator, the improvement wherein the lamps used in said lighting system comprised high intensity discharge lamps, said lamps being operable continuously throughout the entire range of the operating speeds of said engine.

2. The invention in accordance with claim 1 wherein said lamps comprise metal halide lamps.

3. The invention in accordance with claim 1 or claim 2 and said lamps having a specified operating frequency, wherein the alternator output frequency at rated speed of said engine corresponds to said lamp specified operating frequency.

4. The invention in accordance with claim 3 and said engine speed being capable, upon release of said load, of momentarily exceeding said high idle speed.

* * * * *